United States Patent
Kim

(10) Patent No.: US 8,051,042 B2
(45) Date of Patent: Nov. 1, 2011

(54) APPARATUS AND METHOD FOR MANAGING DATA

(75) Inventor: Ik-su Kim, Gwangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 11/723,650

(22) Filed: Mar. 21, 2007

(65) Prior Publication Data
US 2007/0276876 A1 Nov. 29, 2007

(30) Foreign Application Priority Data

May 29, 2006 (KR) .................. 10-2006-0048260

(51) Int. Cl.
*G06F 17/30* (2006.01)
(52) U.S. Cl. ......... 707/644; 707/609; 707/667; 707/964
(58) Field of Classification Search .................. 707/609, 707/644, 667, 964
See application file for complete search history.

(56) References Cited

U.S. PATENT DOCUMENTS

| | | | | |
|---|---|---|---|---|
| 5,276,874 A | * | 1/1994 | Thomson | 1/1 |
| 5,361,361 A | * | 11/1994 | Hickman et al. | 715/705 |
| 6,625,591 B1 | | 9/2003 | Vahalia et al. | |
| 7,734,655 B2 | * | 6/2010 | Ando | 707/802 |
| 2003/0163449 A1 | * | 8/2003 | Iwano et al. | 707/1 |
| 2005/0108466 A1 | * | 5/2005 | Takashima et al. | 711/100 |
| 2006/0077775 A1 | * | 4/2006 | Itoh et al. | 369/30.18 |
| 2006/0239144 A1 | * | 10/2006 | Gotoh et al. | 369/47.27 |
| 2007/0061584 A1 | * | 3/2007 | Takashima et al. | 713/176 |
| 2007/0136520 A1 | * | 6/2007 | Scholl et al. | 711/112 |
| 2008/0117752 A1 | * | 5/2008 | Kishimoto | 369/47.15 |

FOREIGN PATENT DOCUMENTS

| | | |
|---|---|---|
| JP | 2003-505791 A | 2/2003 |
| KR | 20020039663 A | 5/2002 |
| KR | 2005-0114410 A | 12/2005 |
| KR | 20030001392 A | 1/2006 |
| WO | 01/75566 A2 | 10/2001 |
| WO | 01/95331 A2 | 12/2001 |
| WO | WO 03/017682 A2 | 2/2003 |

* cited by examiner

*Primary Examiner* — Shyue Jiunn Hwa
(74) *Attorney, Agent, or Firm* — Sughrue Mion, PLLC

(57) ABSTRACT

An apparatus for and a method are provided for managing data by dividing file identifier descriptors (FIDs) included in metadata of a universal disk format (UDF) file system, and arranging them. The apparatus for managing data includes an input unit that receives a command for generating data in a file system environment, a controller that determines a data type corresponding to the command, a data generator that generates the data by referring to the command, and a metadata updater that arranges an FID with respect to the generated data according to the data type.

11 Claims, 6 Drawing Sheets

APPARATUS AND METHOD FOR MANAGING DATA

CROSS-REFERENCE TO RELATED APPLICATION

This application is based on, and claims priority from Korean Patent Application No. 10-2006-0048260 filed on May 29, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to managing data, and more particularly, to managing data by dividing file identifier descriptors (FIDs) included in metadata of universal disk format (UDF) file system and arranging them.

2. Description of the Related Art

In general, an operating system (OS) uses a file system in order to manage data. The file system is an essential component having a logical structure for the management of data. For example, the format command in Microsoft Windows is a process of creating the file system and initializing it. That is, a user cannot store or delete files until a file system has been created.

Different OSs use different file systems. For example, file allocation table (FAT) and new technology file system (NTFS) are used in the Windows operating system, and the Unix file system (UFS), extended 2 (EXT2), extended 3 (EXT3), and journaling file system (JFS) are used in Unix, Linux and variants thereof. Each file system provides extra functions such as data coding and data compression.

The file system organizes and stores files, and is divided into a data area where real data (e.g., a file or a directory) is stored, and an information area where information on the data stored in the data area is stored. That is, the information on the property, access permission, access time, size, and location of the data is stored in the information area.

In contrast, the UDF is a file system standard for an optical medium, which was developed by OSTA. UDF is used in place of a conventional ISO 9660 file systems, which are not suitable for optical media such as digital versatile discs (DVDs) and compact disc rewritables (CD-RWs), and has functions to read the data of one file at a time without wasting overhead, and to partially or completely delete the file on the CD-RW medium using a new technique called packet writing.

A UDF system is divided into a data area where data is stored and a data entry area where information on the data stored in the data area is stored. Here, the data includes files and directories. The data area of the file stores a real file, whereas the data area of the directory stores information on the file and subdirectory.

The data area of the directory storing the information on the file and subdirectory is called a directory area and information on the file and subdirectory included in a corresponding directory is recorded in the form of an FID therein. The FID includes the name of the file or subdirectory and information on a save location thereof.

Metadata refers to a data entry area of the file in the case of the file, and the sum of the data entry area and the directory area in the case of the directory and FIG. 1 illustrates metadata 100 of a related art directory.

Referring to FIG. 1, the data entry areas 11, 13, and 15 of the directory and the directory areas 12, 14, and 16 are arranged. FIDs 111, 112, 113, 114, 121, 122, 123, 131, and 132 are respectively arranged in the directory areas 12, 14, and 16.

Here, when searching for a file "FILE__6" 131 along a path "DIR__1/DIR__2/FILE__6", a device executes a search by referring to the metadata 100 in the order the FIDs included therein were created.

That is, the device respectively searches for "FILE__1" 111, "FILE__2" 112, and "DIR__1" 113 arranged in a directory area 12 of a root directory 110. Then, the device respectively searches for "FILE__4" 121, "FILE__5" 122, and "DIR__2" 123 arranged in a directory area 14 of a directory "DIR__1" 120.

Specifically, the device searches for the files "FILE__1" 111 and "FILE__2" 112 in order to search for the directory "DIR__1" 113 in the directory area 12 of the root directory 100, thereby wasting computer resources and increasing the search time. This is particularly disadvantageous for the UDF file system storing a large number of files and directories.

Therefore, a new method that can reduce the waste of computer resources and the search time in the UDF file system is needed.

SUMMARY OF THE INVENTION

The present invention provides an apparatus for and method of managing data by dividing FIDs included in metadata of UDF file system and arranging them.

According to an aspect of the present invention, there is provided an apparatus for managing data, the apparatus including an input unit that receives a command for generating data in a file system environment; a controller that determines a data type corresponding to the command; a data generator that generates the data by referring to the command; and a metadata updater that arranges an FID with respect to the generated data according to the data type.

According to another aspect of the present invention, there is provided a method of managing data, the method including receiving a command for generating data in a file system environment; determining a data type that corresponds to the command; generating data by referring to the command; and arranging an FID with respect to the generated data according to the data type.

BRIEF DESCRIPTION OF THE DRAWINGS

The above and other aspects of the present invention will become apparent by describing in detail exemplary embodiments thereof with reference to the attached drawings, in which.

DETAILED DESCRIPTION OF EXEMPLARY EMBODIMENTS OF THE INVENTION

Figure 1:
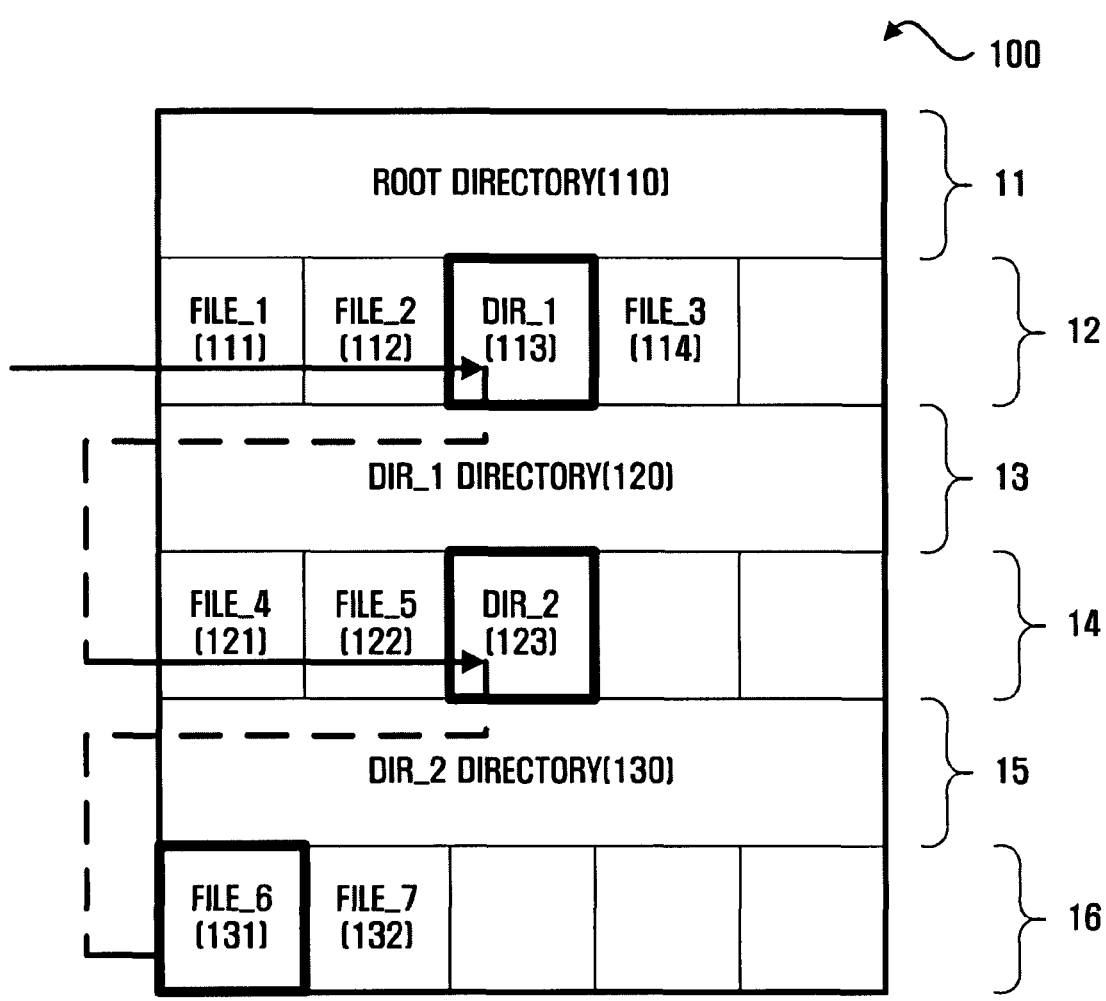
FIG. 1 illustrates metadata 100 of a related art directory.

Exemplary embodiments of the present invention will be described in detail with reference to the accompanying drawings.

Aspects and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention.

Figure 2:
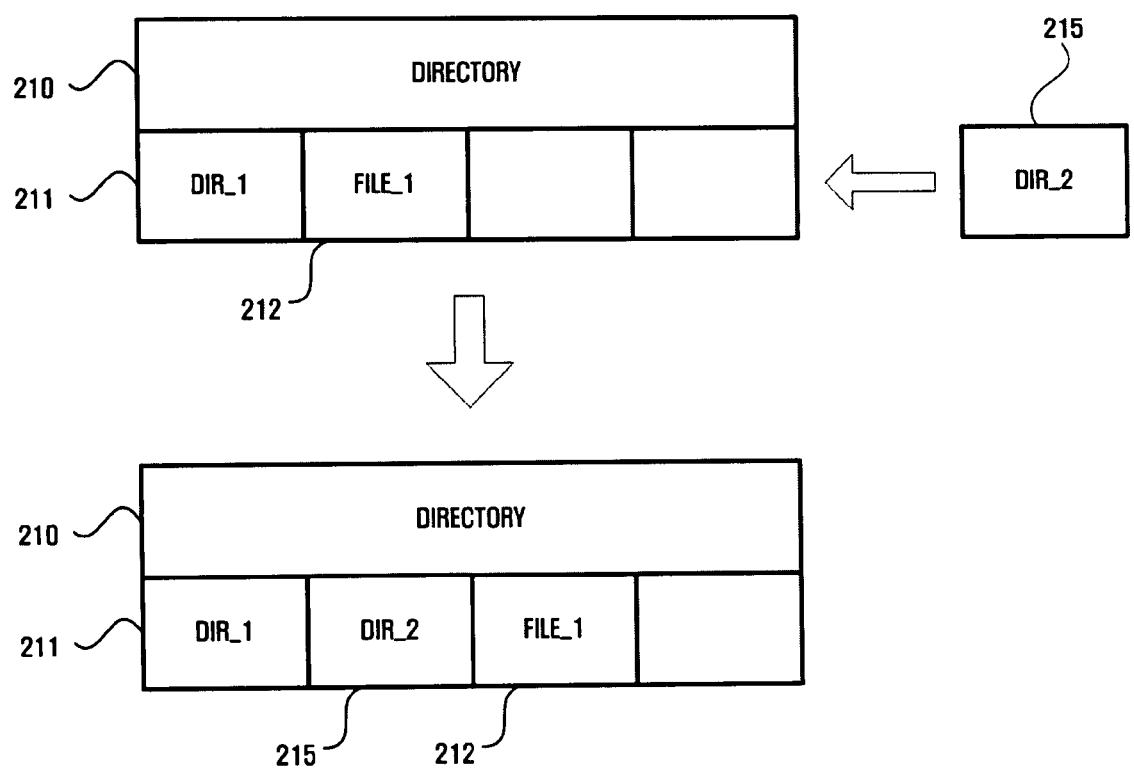
FIG. 2 illustrates metadata of a directory according to an exemplary embodiment of the present invention.

FIG. 2 illustrates metadata of a directory according to an exemplary embodiment of the present invention.

Unlike a related art UDF file system where FIDs of the data are arranged in the order they were created in metadata regardless of the type of the data, in a UDF file system according to an exemplary embodiment of the present invention, the FIDs with respect to the data of the same type are adjacently arranged in the metadata.

For example, when a new directory is created in a file system where "DIR_1" 211 that is an FID of a specific directory 210 and "FILE_1" 212 that is a file FID are respectively arranged, "DIR_2" 215 that is an FID of the new directory is arranged after "DIR_1" 211 as opposed to "FILE_1" 212. That is, "DIR_2" 215 is created adjacent to "DIR_1" 211 that is the same type thereas although "FILE_1" 212 was created before "DIR_2" 215.

Here, the file FID 212 should be preceded by the directory FIDs 211 and 215 because in general, the number of subdirectories included in a single directory is larger than that of files included therein. In addition, multiple subdirectories are searched in order to find a single file or a directory.

Here, information such as the property, access permission, access time, size, and save location of the data (the file or directory) is stored in the FIDs 211, 212, and 215 included in the metadata. The FIDs are automatically arranged in the order they were created, or are manually arranged by a user.

For example, "DIR_1" 211 may be arranged after "DIR_2" 215 according to the order of creation or "DIR_2" 215 that is lastly create may precede "DIR_1" 211 or the FIDs may be arranged in order at random by the user.

Figure 3:
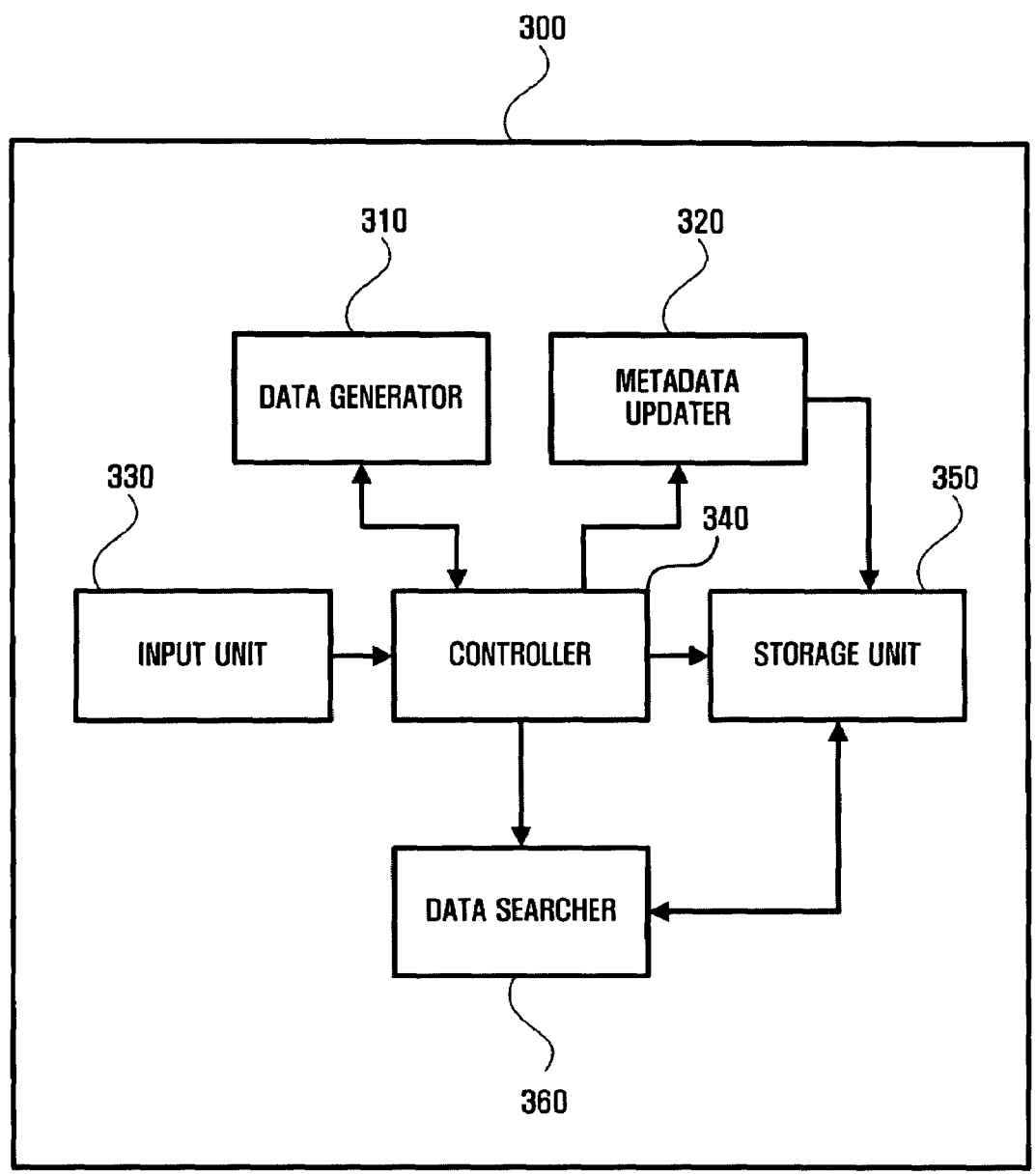
FIG. 3 is a block diagram illustrating an apparatus for managing data according to an exemplary embodiment of the present invention.

FIG. 3 is a block diagram illustrating an apparatus for managing data according to an exemplary embodiment of the present invention. A data management apparatus 300 includes a data generator 310, a metadata updater 320, an input unit 330, a controller 340, a storage unit 350, and a data searcher 360.

The apparatus includes computers, digital TVs, mobile phones, personal digital assistants (PDAs), portable multimedia players (PMPs), MP3 players, USB memory sticks, and other devices using a file system, including the storage unit 350.

Although the file system of the data management device 300 may be one of a FAT, NTFS, UFS, EXT2, EXT3, or JFS file system, UDF may be used in order to separately store the file FIDs and the directory FIDs as illustrated in FIG. 2.

The storage unit 350 stores the data or metadata. In addition, the storage unit 350 may be formed of a module that can input and output information, including a hard disk, a flash memory, a compact flash (CF) card, a secure digital (SD) card, a smart media (SM) card, a multimedia card (MMC), or a memory stick. The storage unit 350 may be put inside the data management apparatus 300 or in another device.

The input unit 330 receives a command for generating data from a user. In order to perform such a task, the input unit 330 may have a button, a touch pad, or a wheel, which can receive characters or numbers. The user inputs the command for generating the data may include the name, type, property, access time, size and save location of the data.

The controller 340 determines the type of the data generated by the command for generating the data, i.e., whether the data is a file or a directory. The controller 340 may execute the determination by referring to the type of the data included in the command for generating the data.

In addition, the controller 340 controls the data generator 310, the metadata updater 320, the input unit 330, the storage unit 350, the data searcher 360, and the data management apparatus 300.

The data generator 310 generates the data by referring to the command for generating the data input via the input unit 330. The generated data may be stored in the storage unit 350, or used for other tasks.

The metadata updater 320 arranges FID generated according to the data type by the data generator 310, i.e., updates the metadata stored in the storage unit 350. If the data is a directory, the metadata updater 320 arranges a new FID adjacent to the directory FID included in the metadata but if the data is a file, it arranges the new FID adjacent to the file FID included in the metadata.

Here, the metadata updater 320 may arrange the FID with respect to the directory ahead of the FID with respect to the file in order to efficiently use the search time subject to the directory or file ratio and the hierarchically stored data. The file FID may be arranged before the directory FID by the user.

The data searcher 360 searches for the stored data according to the input search command by referring to the metadata.

The search command includes a directory name designating a directory path and a file name designating a file path and each of which may be directly input by the user or automatically generated and input by a separate module.

The file or directory path included in the search command is divided by a slash that the data searcher 360 uses to sequentially extract each path. In addition, the data searcher 360 searches for the FID having the same name as the file or directory name in the metadata.

Figure 4:
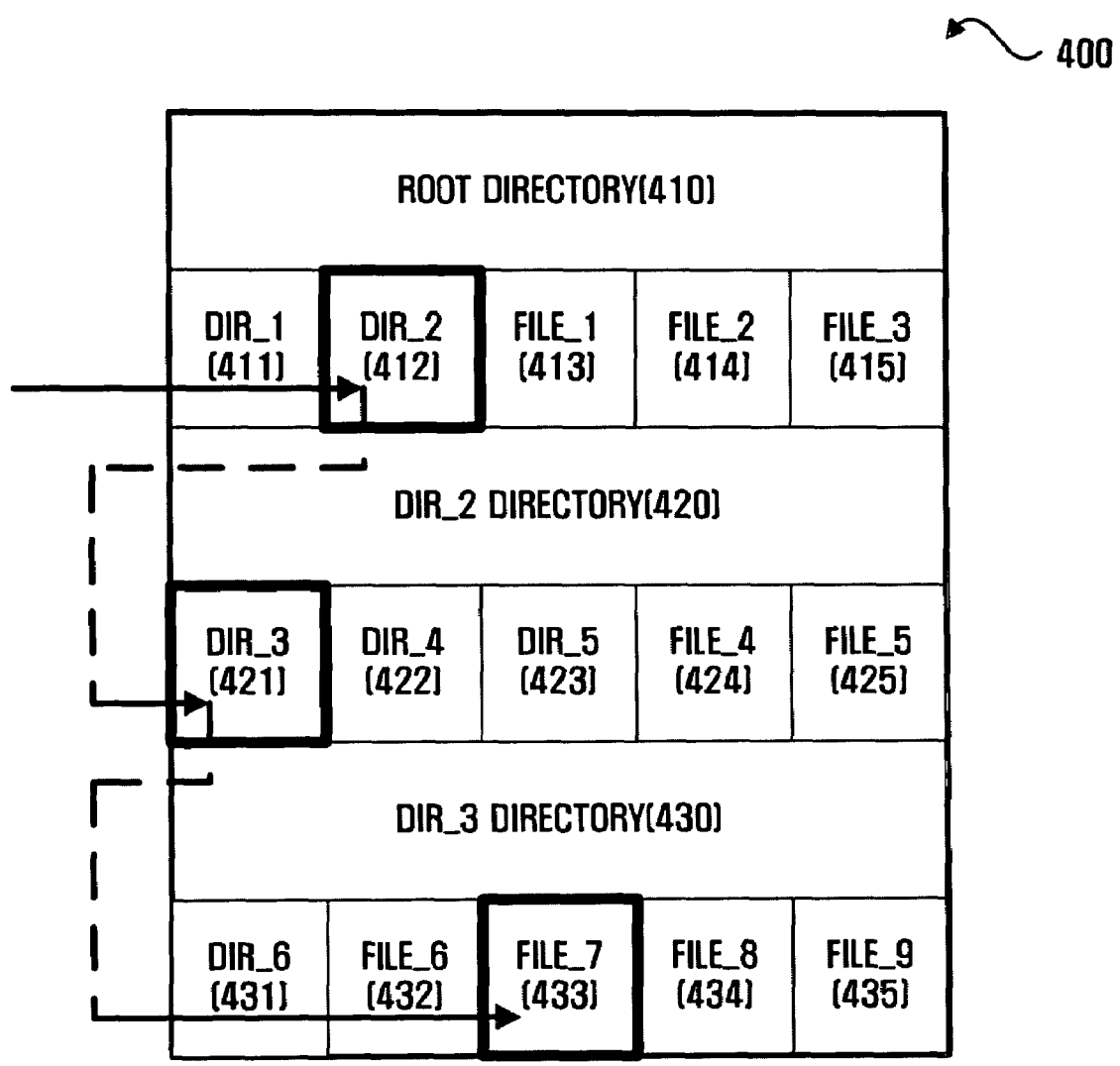
FIG. 4 is a conceptual diagram illustrating a process of searching data according to an exemplary embodiment of the present invention.

FIG. 4 is a conceptual diagram illustrating a process of searching for data according to an exemplary embodiment of the present invention.

FIDs included in the metadata that is stored in the storage unit 350 are adjacently stored according to the type thereof. That is, as appears in metadata 400 of FIG. 4, "DIR_1" 411 and "DIR_2" 412 of a root directory 410 are adjacently arranged and "FILE_1" 413, "FILE_2" 414, and "FILE_3" are adjacently arranged. In directories "DIR_2" 420 and "DIR_3" 430, the directory FIDs 421, 422, 423, and 431 are adjacently arranged and the file FIDs 424, 425, 432, 433, 434, and 435 are adjacently arranged in their respective directories.

If a search command input by a user is "/DIR_2/DIR_3/FILE_7", the FIDs in the metadata 400 are searched in the following order.

First, a data searcher 360 searches for "DIR_1" 411 that is firstly arranged among the FIDs included in the directory area of the root directory 410, and then searches for "DIR_2" 412. Here, since "DIR_2" 412 has the same path as the directory path included in the search command, the data searcher 360 ceases to search in the root directory 410 and starts searching in "DIR_2" 420. That is, the data searcher 360 skips searching for "FILE_1" 413, "FILE_2" 414 and "FILE_3" 415.

Then, the data searcher 360 searches for "DIR_3" 421 that is firstly arranged among the FIDs included in the directory area of the directory "DIR_2" 420. Here, since "DIR_3" 421 has the same path as the directory path included in the search command, the data searcher 360 ceases to search in the directory "DIR_2" 420 and starts searching for "DIR_3" 430. That is, the data searcher skips searching for "DIR_4" 422, "DIR_5" 423, "FILE_4" 424, and "FILE_5" 425.

The data searcher 360 then respectively searches for "DIR_6" 431 that is firstly arranged among the FIDs included in the directory area of the directory "DIR_3" 430, "FILE_6" 432, and "FILE_7" 433.

In this care, since "FILE_7" 433 has the same path as the file path included in the search command, the data searcher 360 ceases to search in the directory "DIR_3" 430. That is, the data searcher 360 skips searching for "FILE_8" 434 and "FILE_9" 435 and completely terminates the search because "FILE_7" 433 is the final path of the search command.

Here, the path of the search for "FILE_7" 433 that is executed by the data searcher 360 is as follows: "DIR_1" 411, "DIR_2" 412, "DIR_3" 421, "DIR_6" 431, "FILE_6" 432, and "FILE_7" 433. That is, the search for the final file FID, "FILE_7" 433 is executed through six steps.

On the other hand, according to a related art method, the search for "FILE_7" 433 is execute through 13 steps: "DIR_1" 411, "DIR_2" 412, "FILE_1" 413, "FILE_2" 414, "FILE_3" 415, "DIR_3" 421, "DIR_4" 422, "DIR_5" 423, "FILE_4" 424, "FILE_5" 425, "DIR_6" 431, "FILE_6" 432 and "FILE_7" 433.

The number of searches executed according to an exemplary embodiment of the present invention is smaller than the number of searches executed according to the related art method. That is, search efficiency increases as the number of the directories and files included in the tier increases.

Figure 5:
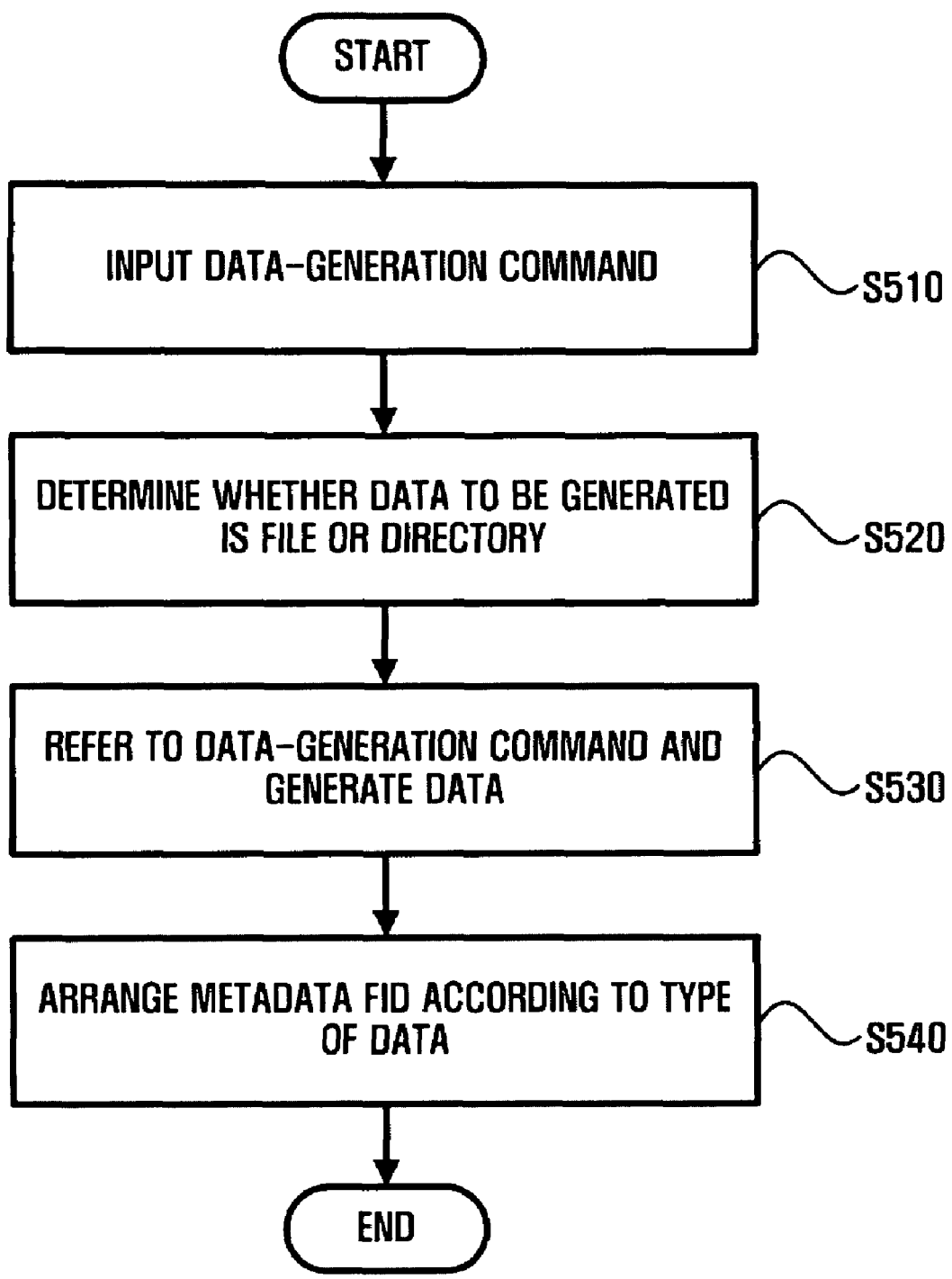
FIG. 5 is a flow chart illustrating a process of generating data according to an exemplary embodiment of the present invention.

FIG. 5 is a flow chart illustrating a process of generating data according to an exemplary embodiment of the present invention.

An input unit 330 of a data management apparatus 300 receives a command for generating data from a user (S510). The data-generation command may include information such as the name, type, property, access permission, access time, size and save location of the data.

The input data-generation command is transmitted to a controller 340, which determines whether the data to be generated is a directory or a file by referring to the data-generation command (S520). The result of the determination is transmitted to a metadata updater 320.

Here, the input data-generation command is also transmitted to a data generator 310, which refers to the input data-generation command, and generates the data (S530).

The metadata updater 320 arranges an FID with respect to the data generated by a data generator 310 according to the result of the determination, i.e., whether the generated data is the file or directory (S540). Here, the FID is included in metadata stored in a storage unit 350 and if the FID with respect to the generated data is the directory FID, the metadata updater 320 arranges the FID with respect to the generated data adjacent to the FID with respect to the directory among the FIDs included in the metadata. If the FID with respect to the generated data is the file FID, the metadata updater 320 arranges the FID with respect to the generated data adjacent to the FID with respect to the file.

Figure 6:
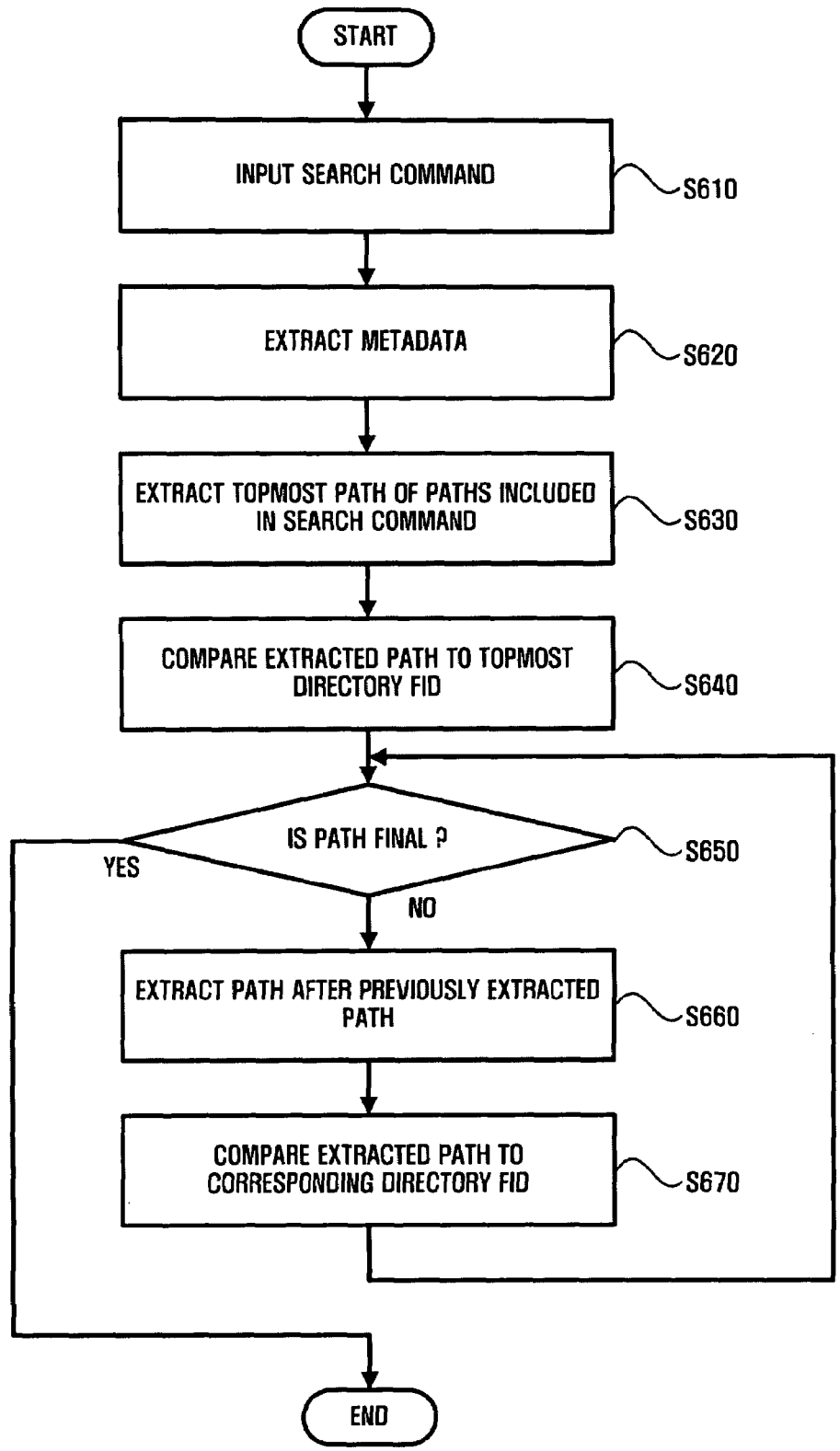
FIG. 6 is a flow chart illustrating a process of generating data according to an exemplary embodiment of the present invention.

FIG. 6 is a flow chart illustrating a process of generating data according to an exemplary embodiment of the present invention.

An input unit 330 of a data management device 300 receives a search command including a directory path and a file path from a user (S610).

The search command is transmitted to a data searcher 360, which extracts metadata stored in a storage unit 350 (S620).

Then the data searcher 360 extracts the topmost path among the directory or file path included in the search command (S630), and compares the extracted path to an FID included in a directory area of the topmost directory among the FIDs included in the metadata (S640). Here, a comparison process is executed in the order of the arrangement.

If an FID that is the same as the extracted path exists, the data searcher 360 checks if the currently extracted path is the final path (S650). If it is the final path, the data searcher 360 terminates the search. Otherwise, the data searcher 360 extracts a path that comes after the previously extracted path S660 in the search command, and compares the extracted path to the FID included in the directory area corresponding to the previously extracted path among form the FIDs included the metadata (S670).

This process continues until the search for the past path is executed.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in reverse order, depending upon the functionality involved.

As described above, according to an apparatus for and method of managing data, the following effect can be anticipated.

According to the exemplary embodiments of the present invention, overhead and search time can be reduced by managing directories and files dividing FIDs included in metadata of a UDF file system into a directory FID and a file FID.

The exemplary embodiments of the present invention have been explained with reference to the accompanying drawings, but it will be apparent to those skilled in the art that various modifications and changes may be made thereto without departing from the scope and spirit of the invention. Therefore, it should be understood that the above exemplary embodiments are not restrictive but illustrative in all aspects.

What is claimed is:

1. An apparatus for managing data, the apparatus comprising:
   a processor which comprises:
   an input unit that receives a command for generating data in a file system environment;
   a controller that determines a data type corresponding to the command;
   a data generator that generates the data by referring to the command;
   a metadata updater that arranges a file identifier descriptor (FID) with respect to the generated data according to the data type; and
   a storage unit that stores a plurality of FIDs,
   wherein the plurality of FIDs stored in the storage unit are arranged in the storage unit according to the data type;
   wherein the metadata updater arranges a directory FID before a file FID.

2. The apparatus of claim 1, wherein the file system comprises a universal-disk-format file system.

3. The apparatus of claim 1, wherein the data is a file or a directory.

4. The apparatus of claim 1, wherein the metadata updater adjacently arranges FIDs of a same data type.

5. The apparatus of claim 1, further comprising a data searcher that searches for the stored data in the order FIDs are arranged.

6. The apparatus of claim 1, wherein the data type is at least one of a file and a directory.

7. A method of managing data, the method comprising:
   receiving, by a data management apparatus, a command for generating data in a file system environment;
   determining, by the data management apparatus, a data type that corresponds to the command;
   generating, by the data management apparatus, data by referring to the command;
   arranging, by the data management apparatus, a file identifier descriptor (FID) with respect to the generated data according to the data type; and
   storing a plurality of FIDs in a storage unit,
   wherein the plurality of FIDs stored in the storage unit are arranged in the storage unit according to the data type;
   wherein the arranging of the FID with respect to the generated data according to the data type comprises arranging a directory FID before a file FID.

8. The method of claim 7, wherein the file system comprises a universal-disk-format file system.

9. The method of claim 7, wherein the data is a file or a directory.

10. The method of claim 7, wherein the arranging of the FID with respect to the generated data according to the data type includes adjacently arranging FIDs of a same type.

11. The method of claim 7, further comprising searching for the stored data according to the order FIDs are arranged in.

* * * * *